United States Patent
Rudrabhatla et al.

(10) Patent No.: US 12,045,240 B2
(45) Date of Patent: Jul. 23, 2024

(54) INTERACTIVE QUERY BY EXAMPLE EXPERT SYSTEM FOR AUTONOMOUS DATA PROTECTION

(71) Applicant: EMC IP Holding Company LLC, Hopkinton, MA (US)

(72) Inventors: Anand Rudrabhatla, Pleasanton, CA (US); Jehuda Shemer, Kfar Saba (IL); Abhinav Duggal, Santa Clara, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 118 days.

(21) Appl. No.: 17/447,898

(22) Filed: Sep. 16, 2021

(65) Prior Publication Data

US 2023/0084142 A1 Mar. 16, 2023

(51) Int. Cl.
*G06F 16/2455* (2019.01)
*G06F 16/16* (2019.01)

(52) U.S. Cl.
CPC ...... *G06F 16/24553* (2019.01); *G06F 16/164* (2019.01)

(58) Field of Classification Search
CPC .................. G06F 16/24553; G06F 16/164
See application file for complete search history.

(56) References Cited

U.S. PATENT DOCUMENTS

| | | | | |
|---|---|---|---|---|
| 8,725,973 | B2 * | 5/2014 | Prahlad | G06F 16/2272 711/6 |
| 2011/0161319 | A1 * | 6/2011 | Chunilal | G06Q 30/02 707/769 |
| 2014/0114946 | A1 * | 4/2014 | Ture | G06F 21/53 707/709 |
| 2016/0180451 | A1 * | 6/2016 | Visbal | G06F 3/0482 705/35 |
| 2016/0254958 | A1 * | 9/2016 | Chen | H04L 41/40 709/220 |
| 2017/0068712 | A1 * | 3/2017 | Streufert | G06F 16/9024 |
| 2018/0191730 | A1 * | 7/2018 | Deters | H04L 63/105 |
| 2018/0253408 | A1 * | 9/2018 | Severn | G06F 16/9577 |
| 2019/0034813 | A1 * | 1/2019 | Das | G06N 5/022 |
| 2019/0215551 | A1 * | 7/2019 | Modarresi | G06N 3/08 |
| 2020/0045066 | A1 * | 2/2020 | Meng | H04L 63/1416 |
| 2020/0117569 | A1 * | 4/2020 | Bhide | G06F 9/5016 |
| 2020/0250734 | A1 * | 8/2020 | Pande | G06N 3/0445 |
| 2020/0334068 | A1 * | 10/2020 | Krishnamurthy | G06F 11/3433 |

* cited by examiner

*Primary Examiner* — Miranda Le
(74) *Attorney, Agent, or Firm* — Workman Nydegger (57) ABSTRACT

One example method includes scanning a storage device to obtain data and metadata concerning operation of a computing system, analyzing the data and, based on the analyzing, deriving data groups that include some of the data, and deriving data relationships among some of the data, receiving, by an expert system, a query from a user, and the query specifies a sample object for the expert system to investigate, but the query does not indicate purpose of the user in submitting the query, analyzing the query, based on the data groups and data relationships, and based on the analyzing of the query, generating, by the expert system, query results that comprise a set of user-selectable investigation directions that relate to the sample object, and presenting, by the expert system, the set of user-selectable investigation directions to the user.

14 Claims, 5 Drawing Sheets

INTERACTIVE QUERY BY EXAMPLE EXPERT SYSTEM FOR AUTONOMOUS DATA PROTECTION

FIELD OF THE INVENTION

Embodiments of the present invention generally relate to data protection. More particularly, at least some embodiments of the invention relate to systems, hardware, software, computer-readable media, and methods for finding information needed for the effective and efficient operation and management of data protection systems.

BACKGROUND

It often occurs that a user wants to query or mine information about entities in a data protection system but the user may not necessarily have the knowledge and experience to accomplish such a task. As well, the user may not know or be aware of the querying techniques likely to produce the best results for the particular data protection system that the user is working with.

In more detail, IT personnel are overwhelmed with the volume, velocity, and variety of data that they have to protect for their business units in a distributed, hybrid environment while simultaneously, their IT budgets in general are decreasing or at best, growing modestly. The IT personnel are required to manage more data with fewer resources, putting pressure on them and their teams to deliver operational efficiencies.

To address these challenges of managing the data within budget and deliver on the protection SLAs to the business owners, IT personnel are responding by consolidating their secondary data (unstructured data) and backups (for data protection) on a single, highly scalable, integrated (with both backup software and target storage) clustered system that offers a single, consolidated management end point for operational simplicity and cost savings from storage consolidation. Additionally, to get more value out of their data, IT personnel are running complementary applications on the same platform used to store secondary copies and generating more data. Such a single storage system serving use cases related to both unstructured storage and data protection, is continually ingesting and consolidating multi-PBs (petabytes) of data from thousands of client data sources.

When managing such an integrated, highly scalable consolidated data protection storage system, the challenge for IT operators and application admins is to find information quickly and efficiently without requiring years of operational experience and time consuming analysis. The ability to quickly and reliably obtain such information is important to the effective and efficient operation of the data protection system.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Embodiments of the present invention generally relate to data protection. More particularly, at least some embodiments of the invention relate to systems, hardware, software, computer-readable media, and methods for finding information needed for the effective and efficient operation and management of data protection systems.

In general, example embodiments of the invention may implement and employ an "interactive query by example" approach that may enable the query system to give the user options and directions based on examples the user provides to the system, and suggested examples the system provides to the user to select from. This functionality may be implemented even in cases where the user is unsure of what he is looking for, and embodiments may aid the user in formulating a query. Thus, example embodiments of the invention may contrast with conventional systems where the user already knows what she is looking for, and simply formulates a query, on her own, that identifies the information that is sought.

In more detail, some example embodiments may enable similarity and dissimilarity based queries by an example expert system for triage to identify hotspots and root-cause analysis by providing actionable insights into a data protection system. The expert system may be based on a query engine that analyzes the data protection platform and associated stored metadata, and uses that information to return the results with query recommendations to the user. Some embodiments may be particularly well suited for use with the DellEMC Power Protect Data Manager (PPDM) platform (defining a control path) and the DellEMC DataDomain (DD) platform (defining a data path). However, the scope of the invention is not limited to use with these example platforms.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of at least some embodiments of the invention is that such embodiments may assist a user in formulating a query for information, even if the user is unsure as to what information the user needs. An embodiment of the invention may enable a user to quickly and reliably obtain information about a data protection system that the user may employ to improve the effectiveness and efficiency of the operation of the data protection system. An embodiment of the invention may enable generation of a query for a user who may lack familiarity and experience with the system concerning which information is sought by the user. Various other features and advantageous aspects of embodiments of the invention will be apparent from this disclosure.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

A. Aspects of an Example Architecture and Environment

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, data protection operations which may include, but are not limited to, data replication operations, IO replication operations, data read/write/delete operations, data deduplication operations, data backup operations, data restore operations, data cloning operations, data archiving operations, and disaster recovery operations. More generally, the scope of the invention embraces any operating environment in which the disclosed concepts may be useful.

At least some embodiments of the invention provide for the implementation of the disclosed functionality in existing backup platforms, examples of which include the Dell-EMC NetWorker and Avamar platforms and associated backup software, and storage environments such as the Dell-EMC DataDomain storage environment. In general however, the scope of the invention is not limited to any particular data backup platform or data storage environment.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment. Where a backup comprises groups of data with different respective characteristics, that data may be allocated, and stored, to different respective targets in the storage environment, where the targets each correspond to a data group having one or more particular characteristics.

Example cloud computing environments, which may or may not be public, include storage environments that may provide data protection functionality for one or more clients. Another example of a cloud computing environment is one in which processing, data protection, and other, services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients that are capable of collecting, modifying, and creating, data. As such, a particular client may employ, or otherwise be associated with, one or more instances of each of one or more applications that perform such operations with respect to data. Such clients may comprise physical machines, or virtual machines (VM)

Particularly, devices in the operating environment may take the form of software, physical machines, or VMs, or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, may likewise take the form of software, physical machines or virtual machines (VM), though no particular component implementation is required for any embodiment. Where VMs are employed, a hypervisor or other virtual machine monitor (VMM) may be employed to create and control the VMs. The term VM embraces, but is not limited to, any virtualization, emulation, or other representation, of one or more computing system elements, such as computing system hardware. A VM may be based on one or more computer architectures, and provides the functionality of a physical computer. A VM implementation may comprise, or at least involve the use of, hardware and/or software. An image of a VM may take the form of a .VMX file and one or more .VMDK files (VM hard disks) for example.

As used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

As used herein, the term 'backup' is intended to be broad in scope. As such, example backups in connection with which embodiments of the invention may be employed include, but are not limited to, full backups, partial backups, clones, snapshots, and incremental or differential backups.

B. Overview

As noted earlier, example embodiments of the invention may implement and employ an "interactive query by example" approach that may enable the query system to give the user options and directions based on examples the user provides to the system, and suggested examples the system provides to the user to select from. This may be important because users may lack the ability to analyze and understand what is happening in the system. Thus, there is a need to assist administrators in getting deep insights and information concerning the internals of the data protection system, particularly in cases where the administrators may have little to no knowledge or experience with the system.

With these considerations in view, example embodiments of the invention may embrace a "query by example" approach in which a user may provide a query system with a sample object, such as a VM, volume, or copy, for example to investigate so as to gain information about the object, or track an error, for example. The query system may then provide, to the user, interesting exploration options to enable the user to drill deeper on a particular object, error, or other item of interest. Embodiments may include various aspects, such as how user-selectable options may be automatically derived and ranked, how the user interacts with the query system and the data protection system, and how drilling in, by the user, for more information is enabled by exposing options to the user, as opposed to requiring the user to know where to look for such information.

B.1 Some Example Queries

In more detail, example embodiments may address various challenges, such as those noted herein, by providing an expert system, which may be simply referred to herein as the 'system,' that may be capable of providing actionable insights with recommended actions, without requiring either experienced users, or labor intensive analysis of data and information. Suppose, for the sake of illustration, that a user is interested in VMs and VM workloads in a computing environment, such as a data protection environment or cloud computing environment for example, an example embodiment of an expert system may operate to generate and run the following queries, as well as to evaluate the data and information returned by such queries:

1. QUERY—Find VMs which are similar to a particular VM of interest, VM 'X' (by asset and/or event properties across both control and data paths in an integrated system)
   a. User finds a VM with a problem pattern (e.g. VM security was compromised, VM has low dedupe, VM is experiencing poor performance, VM is rapidly growing in capacity etc.) and now starts to search for other VMs with similar problematic patterns to open a line of investigation, by refining and changing the query, to characterize the problem, so the user can identify, and take, proactive remedial actions to improve VM performance.
   b. The integrated expert system may store the query, and the query, results by the user ID, to deliver more refined results faster, tailored for subsequent queries by the same user on a similar topic.
   c. What impending hotspots (such as degradation in performance, capacity, reliability, or availability, for example.) are developing, in which VM clusters, and what are the user options to remediate the hotspots?
   d. Example: an embodiment of the expert system may provide multiple options to enable a user to remediate a hotspot, and may provide recommendations concerning those options—thus, the expert system may, for example, recommend that the user provision more resources in specific tiers for named VM clusters, or rebalance the named VM clusters across different tiers, and they expert system may further recommend that the user stagger such actions by named VM clusters over time period N.
2. QUERY—Find VMs/Assets that have little to no impact on production and network performance while backup is in progress. These assets may be good candidates for moving out of the main backup window, a possible recommendation to the user, to allow other assets, such as higher priority assets, to have more time and resources during the backup window(s).
3. QUERY—Do 'what if' scenarios
   a. Example: for smart scheduling by the backup application, how should I schedule my backups, and in what order, to meet the SLAs (?)—for example, do not schedule low-dedupe workload backups at the same time as dedupable workload backups due to their compute (CPU) intensive requirements.

B.2 Aspects of Some Example Techniques and Approaches

It is noted that, at times, reference may be made herein to the DellEMC PPDM, and DD, platforms, where the PPDM platform is an example of a control path in connection with which embodiments may be implemented, and DD is an example of a data path in connection with which embodiments of the invention may be implemented. However, PPDM and DD are provided for illustrative purposes only, and are not intended to limit the scope of the invention in any way.

With reference to the aforementioned illustrative examples, PPDM (control path) may store all the metadata and characteristics about all the assets, events, and jobs, in a data protection platform. DD (data path) may store similar information about the underlying data that is being protected. Embodiments of the invention may mine such information and metadata about the assets, events, and jobs across both these control and data paths. Such information and metadata may be readily available within a single integrated expert system and may be employed by embodiments of the invention to provide smart analytics, along with insights and recommendations.

Example embodiments may comprise a query layer capable of supporting features and functionalities including, but not limited to:

Grouping assets such as VMs, such as based on whether they are similar or dis-similar, using an integrated database across the control and data paths;

Search and analysis by example—if a user is interested, for example, in a VM or finds a VM with some problem pattern, an example embodiment may now start to search for other VMs with similar patterns to open a line of investigation, such as by refining and changing the query, to characterize the problem, so as to enable the user to take proactive remedial actions; and Storing the results by the user id, for more refined results tailored for subsequent inquiries, on similar topics, by that same user.

The query layer may act on an integrated database that has both asset and event data across control and data paths. Embodiments may guide the user by presenting visual options based on selections and analysis performed by the expert system. The expert system may handle the task of determining what information and metadata to direct the user to, based on smart analysis performed by the expert system, and the expert system may narrow down the options for investigation and resolution. If none of the results returned are interesting to the user, the expert system may offer the option for user to refine their query, or may prompt the user for the next N results in the list. Example embodiments of such an expert system may be considered as a convergence of big data analysis with context aware search and insight driven analytics with recommendations.

B.3 Example Expert System and Workflow

Figure 1:
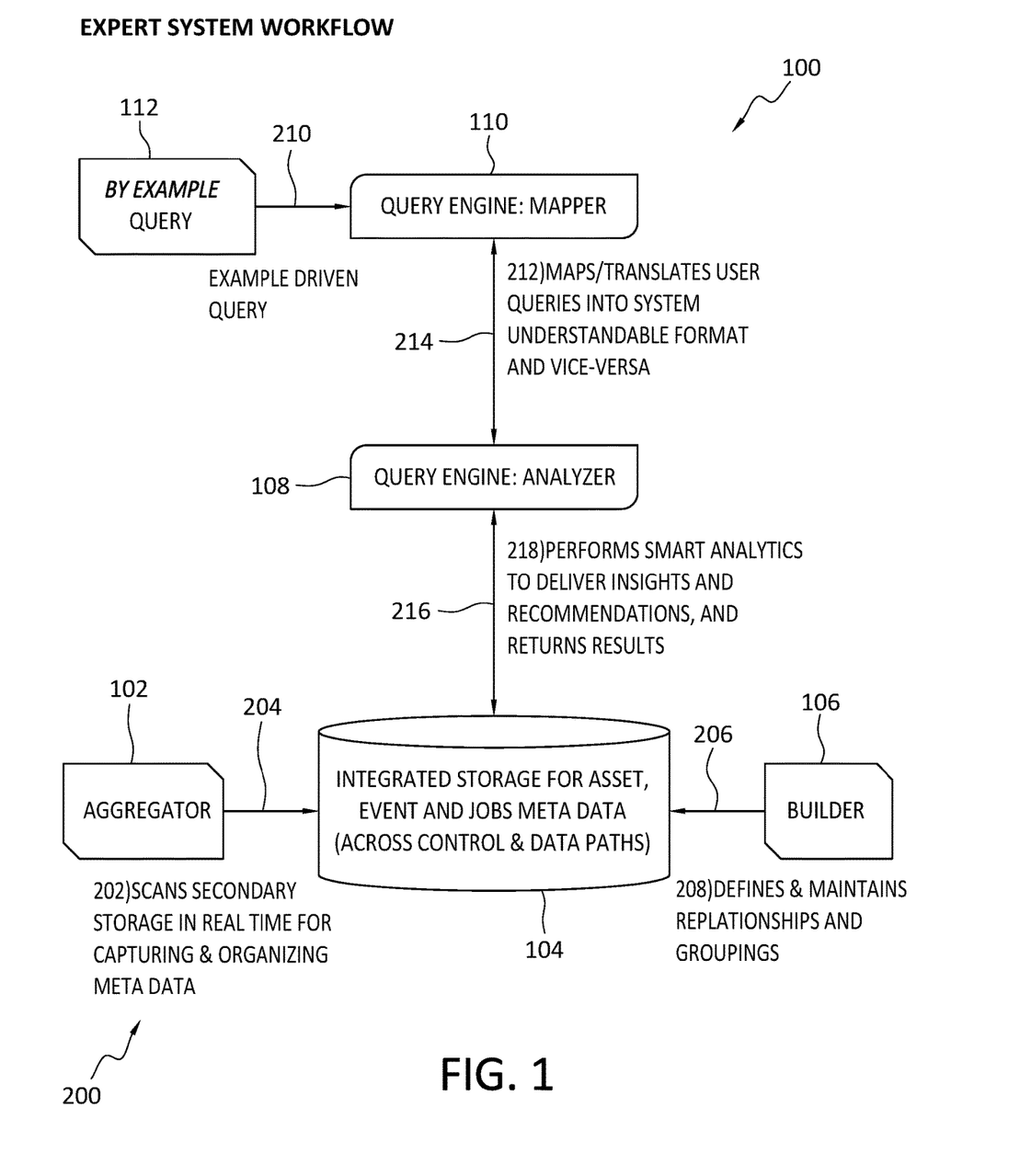
FIG. 1 discloses aspects of an example architecture and method according to some embodiments FIGS. 2a-2h disclose aspects of an example investigation process according to some embodiments.

With attention now to FIG. 1, details are provided concerning an example expert system 100, and associated example workflow 200. As shown there, the expert system 100 may comprise various elements including, for example, an aggregator 102, integrated storage 104, a builder platform 106, a query engine that may comprise an analyzer 108, and a mapper 110, and a query interface 112 by way of which a user may communicate with the expert system 100.

Initially, the aggregator 102 may scan 202 a secondary storage, in real time for example, to capture and organize information and metadata concerning a system, such as a data protection system, that may be of interest. The information and metadata that are obtained may be stored 204 in the integrated storage 104, which may store asset, event, and jobs, metadata, for example, across both control paths and data paths of the system that is being analyzed. Next, the builder 106 may access 206 information and metadata in the integrated storage 104, and may operate 208 to define and maintain relationships between, and groupings of, the information/metadata. The scanning, defining, and maintaining, operations may be performed on an ongoing basis as the system under examination operates.

At some point, the user may transmit 210, from the query interface 112 to the mapper 110, an example of a problem, or condition, or circumstance, in the system under examination, that the user has become aware of. To illustrate with an example presented earlier herein, the user may be aware of a VM that is experiencing a particular problem, and the user would like to determine if other VMs are experiencing the same problem. Thus, the query submitted 210 by the user, using the query interface 112, may simply comprise information about the VM known to be experiencing the problem. Thus, the user may not be aware of specifically what he is looking for, for example, the user does not have enough information to request information on specific VMs in the system. Rather, the user may only be aware that he needs information about other, unspecified, VMs in the system.

After receipt of the query from the user, the mapper 110 may map 212, or translate, the user query into an expert system understandable format. As well, the mapper 110 may also be configured to translate/map expert system information into a format understandable by the user. The translated or mapped information may then be passed 214 by the mapper 110 to the analyzer 108. Based on information received from the user, the analyzer 108 may access 216 the integrated storage 104 to obtain relevant, and/or possibly relevant, information and metadata. The analyzer 108 may then perform 218 various smart analytic processes with regard to this information and metadata, and the output of the analytic processes, which may be provided to the user, may comprise various insights and recommendations relating to the query supplied by the user. In some embodiments, the insights and recommendations may include suggestions, to the user, as to how the query might be modified or refined to obtain possible more relevant results.

B.4 Creating Categories and Selections

In some embodiments, the analyzer 108 may create user-selectable options based on similarity and dissimilarity analyses. For example, there may be a series of similarity based queries that the expert system makes, and ranks. The expert system may then select a user-configurable subset, such as the top 5 for example, to present to the user. In one example data protection context, the following data and information may be available for use by an analyzer:

1. Object metadata—name, location, type etc.
2. Object configuration—running parameters, topology
3. Operational history—operations (backups) done, moves/deletes/restores, and metadata associated with any of those operations, and backup copies.
4. Policy—such as system SLA and policy parameters
5. Data—similar data or data portions
6. Data stats—compression ratio, dedup ratio, entropy, transfer rate
7. System status—related messages, errors, warnings
8. Target location—storage copies stored on
9. Other B.5 Aspects of Example Similarity Queries In general, example similarity queries may try to find items and circumstances that are similar to the example object provided. There are various ways that an object may be defined as being "similar" to another. Similarity may be determined, for example, based on one or more parameters, examples of which include:

1. Equals—the parameter is equal to the same parameter in other objects.
2. Greater than (smaller than)—the parameter is greater than the same parameter in other objects
3. Hamming distance, Levenshtein distance, edit distance—string similarity
4. Prefixes/suffixes—partial string similarity (a special case of the previous item)
5. Hierarchical or natural grouping (called out separately here for clarity, though these can be considered as the "group" or "parent" parameter being "equal")
6. Approximation/proximity—the parameter value is "close to" the parameter value in other objects
7. K-means clustering or other partitioning of samples into clusters—anyone in the same cluster is similar to others in that cluster
8. Sequence—a sequence of operations performed by an entity, or status of the entity, is similar to the operations/status of another entity
9. Group intersection
10. Other B.5 Aspects of Example Dissimilarity Queries Although the use of dissimilarities may seem counterintuitive, because they may be the opposite of similar, these are not Boolean entities and so the relationship between queries is more complex.

1. Anomalies—though no two values may be equal—some stand out more than others.
2. Zero or null values—the lack of value is what is being sought to be identified
3. Singularities—one unique instance of something
4. Not in group—for example, in K means clustering, in any group but the one that the element of interest is in
5. Complement or orthogonal complement of a group
6. Opposites/inverse/extremes (edge of scales)
7. Other

B.6 Implementation of Queries

Running all queries on all values, that is, on all data and metadata, may be too slow, and resource (CPU and memory, for example) intensive. However, embodiments of the invention may make use of existing optimizations for some of the options, although it may not be necessary to use all of the query possibilities. Examples of such optimizations include:

1. Databases may already have indexes for the 'equality,' and 'greater than,' queries that provide efficient queries
2. Approximation/proximity may be implemented by adding an additional column with the approximated values, quantization for example, and indexing the additional columns
3. Clustering may be run periodically, such as daily for example, to define the clusters, and new values coming in may be assigned easily to the existing derived clusters.
4. Anomaly detection may be run periodically to define the anomaly levels. New values may be applied according to those levels.

Once items such as those examples noted above are indexed, a substantial amount of useful information may be derived simply by analyzing the indexes themselves. For example, one or more indexes may be examined to determine if they contain zero/null values, singular values, and value repetition in the index, where the value repetition may define or constitute a group size, that is, a group of those values.

B.7 Ranking of Query Results

In at least some embodiments, query results may be ranked, such as by an analyzer, based on considerations such as, for example, their relevance, context, and diversity. With regard to relevance, query results may be interesting when they are:

1. Special—most dissimilar query results may be interesting
2. Natural groups—equals, group equals, hierarchical, K-Mean etc.
3. Majority—largest groups
4. Minority—smallest groups (many times correlate with dis-similarity)

With regard to context of query results, queries may include various contextual information that may be used to obtain relevant results, and examples of such contextual information may include:

1. The user information including user ID and/or user's RBAC
2. The object(s) given as seed for the investigation
3. Any drill down objects narrow the context
4. Any drill down objects that were backed out of (these may be "less" interesting in some cases)

As to diversity of query results, and especially in the initial investigation options, it may be preferable to have options from diverse directions in the system under examination such as, for example, data path, control path, configuration, and operations. Considerations of these various aspects and parameters of the system may provide a wider canvas for exploration, and potentially more solutions for consideration and implementation by the user. As the context increases, the diversity may close around the context.

Following is an example of an algorithm that may be used to rank query results for consideration by a user:

To select N items to show the user:

1. If there are D diversity directions, select the top K queries such that N<=D*K (in other words enough queries across the diversity directions to reach N results).
2. If there is a special result (dissimilar), select that. The more special (less results, larger anomaly) the higher the ranking.

Else select the largest groups possible.

C. Application and Use of Some Example Embodiments

With attention now to FIGS. 2a-2h, details are provided concerning an illustrative use case for some example embodiments of the invention. The example of FIGS. 2a-2h is not intended to limit the scope of the invention in any way.

Figure 2A:
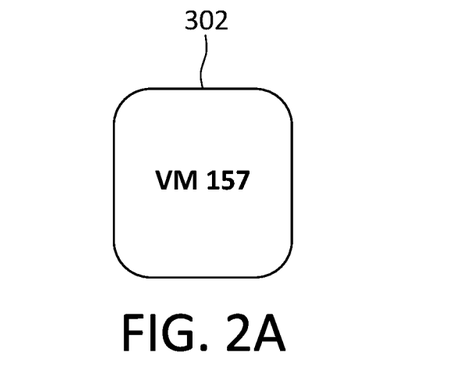

Turning first to FIG. 2a, a user identifies that a backup system is not performing as expected. The user suspects that an entity 302, such as VM 157, may be part of the problem. The investigation starts by the user telling the querying expert system that VM 157 is the starting point of the investigation, that is, VM 157 is the seed. Note that the user has not communicated to the expert system that he is looking into a problem, nor has the user communicated what his intent is. Thus, the investigation may go into different directions, as discussed below.

Figure 2B:
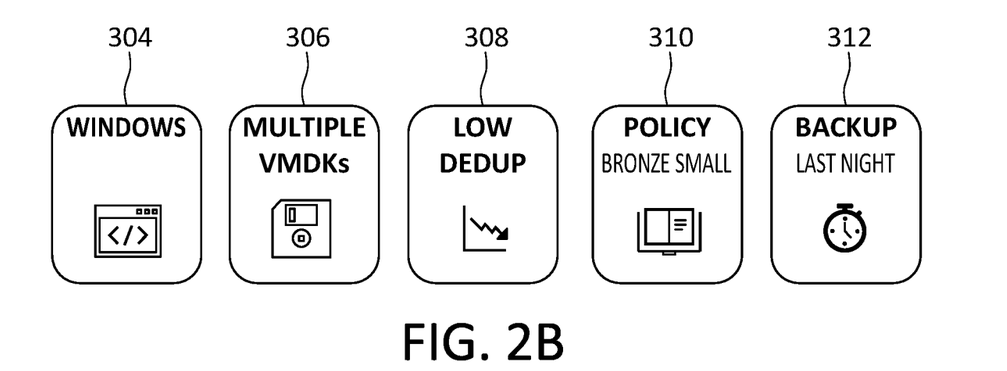

Particularly, and as shown in FIG. 2b, the expert system may analyze VM 157 and, based on the outcome of the analysis, may provide the user, such as through a GUI (Graphical User Interface) for example, with various user-selectable investigation directions that may be taken, where the investigation directions may be suggested based on VM similarity and/or dissimilarity points ascertained by the expert system. Possible investigation directions, that is, possible avenues for further investigation and exploration by the expert system and/or user, may include the elements indicated in FIG. 2b, namely:

a. Windows VMs (similarity based on VM metadata) 304
b. Multiple VMDKs 306, such as 4 VMDKs or more (derived similarity group based on VM configuration metadata)
c. Dedup 308 lower than 15% (derived dissimilarity suggesting this VM is an anomaly)
d. Policy 310 is "Bronze small" (similarity based on backup metadata)
e. Backup 312, such as backed up last night (similarity based on backup schedule)

Note that the aforementioned example categories need not be fixed categories. Rather, those example categories may be derived by the expert system as possible starting points for a more in-depth investigation. The selection may change by the example VM given, the user, and history of searches. The various suggestions presented to the user may be color coded as a hint to possible issues, outliers, common or uncommon instances.

Figure 2C:
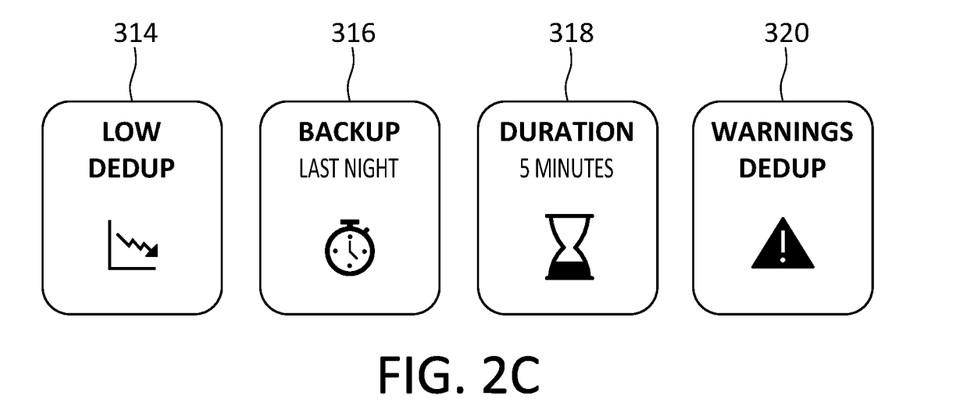

With attention now to FIG. 2c, the user sees the "Low Dedup" 308 and identifies that as the possible problem he was looking for. The user may then select, such as by clicking on, that option. As a result of this selection, the user may now be presented with a new set of categories that are querying around "low dedup." For example, and as shown in FIG. 2c, the new set of categories may include:

a. "Low Dedup" 314—VMs with even lower dedup than VM 157 (note that the context of VM 157 may be retained even after drilling down on the "Low Dedup" option)
b. "Backup" 316—VMs backed up at the same time 316 (similarity based on backup schedule)

c. "Duration" 318—VMs with similar backup duration 318 (similarity based on backup schedule)

d. "Warnings Dedup" 320—system dedup warnings 320 (derived system information based on time or entity)

Upon being presented with the new categories shown in FIG. 2c, the user clicks "Warnings Dedup" 320 and sees that VM 157 has not completed the backup inside the backup window, but most other VMs with low dedup have completed successfully. The "Duration" 318 is 5 minutes, so that in itself may not be the problem. The user clicks on "Low Dedup" 314 and sees that other VMs with even lower dedup have completed the backup on time, so while the low dedup may be an anomaly, it is not necessarily a problem.

Figure 2D:
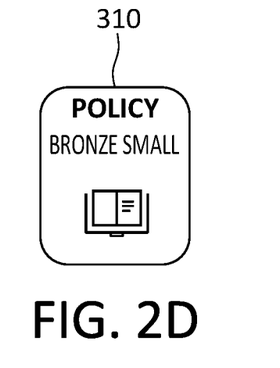
Figure 2E:
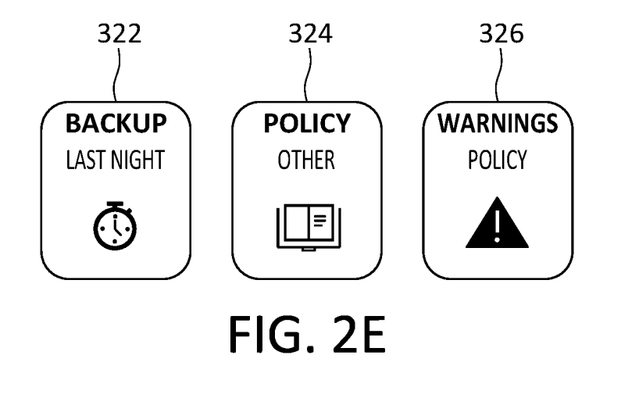

Since "Low Dedup" does not appear to be the problem, the user can return to the choices of FIG. 2b and click on the "Policy" 310 option, as shown in FIG. 2d. That is, the user has drilled down on the "Policy" 310 option. In response to that input from the user, the expert system may then display various related options, such as those indicated in FIG. 2e. These options include "Backup" 322, "Policy (other)" 324, and "Warnings Policy" 326. The "Warnings Policy" 326 option indicates (!) that there were other policies that have recently experienced problems. As such, "Warnings Policy" 326 may merit further investigation. Accordingly, the user may drill down on "Warnings Policy" 326 to see which particular policies experienced problems.

Figure 2F:
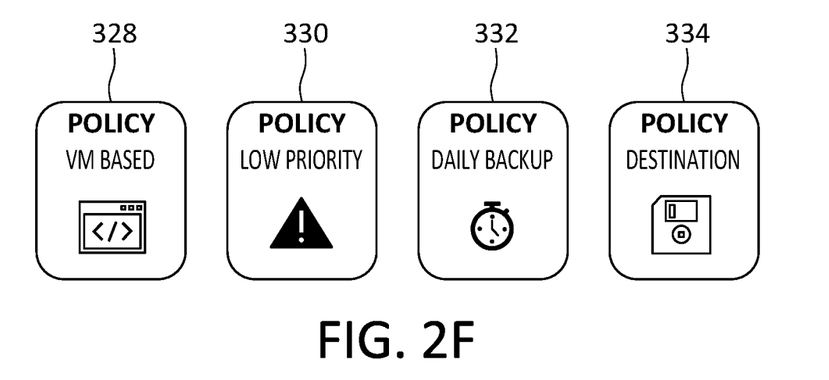
Figure 2G:
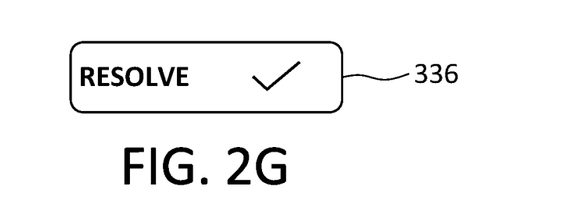

Example options presented as a result of the user drill down on "Warnings Policy" 326 are shown in FIG. 2f. That is, the drill down may result in presentation of a list of policies, one or more of which may have experienced a problem during a time period of interest, such as in the past 12 hours for example. In the example of FIG. 2f, there are various policies that could be further investigated, namely, "Policy (VM based)" 328, "Policy (Low Priority)" 330, "Policy (Daily Backup)" 332, and "Policy (Destination)" 334. In these examples, when the user clicks on "Warnings Policy" 326, the "Policy (Low Priority)" 330 is indicated (!) as possibly problematic. Among other investigation options, and as shown in FIG. 2g, the user may be presented with a context sensitive "Resolve" 336 button that is user-selectable.

Figure 2H:
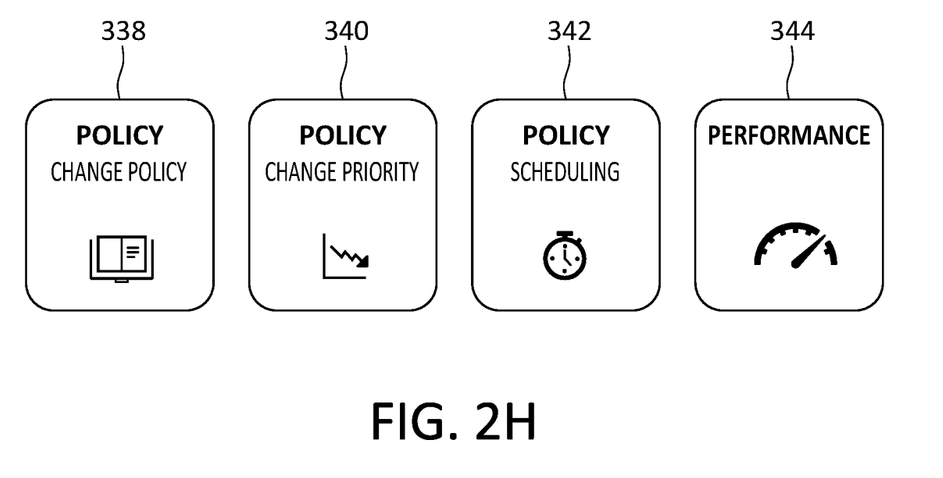

By clicking the "Resolve" 336 button, the user may be presented with various targeted resolution options. For example, and as shown in FIG. 2h, the user-selectable options may include "Policy (change policy)" 338, "Policy (change priority)" 340, "Policy (scheduling)" 342, and "Performance" 344. The user may then select one of these options to, respectively, change the VM 157 to a different policy, change the policy priority, change the scheduling, or start a system performance investigation.

D. Further Discussion

As will be apparent from this disclosure, example embodiments may provide various useful features and advantages. For example, embodiments may provide for a system that uses a sample object, such as a data protection object, that is, an object, such as a VM, which is protected by a data protection process, which may be used as a query. As another example, embodiments may provide an analysis and ranking mechanism to present the user one or more investigation directions that can be employed to steer the investigation in a particular direction. Finally, example embodiments may provide a navigation mechanism that retains the drill down context to improve the results presented to the user as an investigation proceeds.

E. General Aspects of Example Methods

It is noted with respect to the example method of FIG. 1, discussed above, that any of the disclosed processes, operations, methods, and/or any portion of any of these, may be performed in response to, as a result of, and/or based upon, the performance of any preceding process(es), methods, and/or, operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted. Finally, and while it is not required, the individual processes that make up the various example methods disclosed herein are, in some embodiments, performed in the specific sequence recited in those examples. In other embodiments, the individual processes that make up a disclosed method may be performed in a sequence other than the specific sequence recited.

F. Further Example Embodiments

Following are some further example embodiments of the invention. These are presented only by way of example and are not intended to limit the scope of the invention in any way.

Embodiment 1. A method, comprising: scanning a storage device to obtain data and metadata concerning operation of a computing system; analyzing the data and, based on the analyzing, deriving data groups that include some of the data, and deriving data relationships among some of the data; receiving, by an expert system, a query from a user, and the query specifies a sample object for the expert system to investigate, but the query does not indicate purpose of the user in submitting the query; analyzing the query; based on the data groups and data relationships, and based on the analyzing of the query, generating, by the expert system, query results that comprise a set of user-selectable investigation directions that relate to the sample object; and presenting, by the expert system, the set of user-selectable investigation directions to the user.

Embodiment 2. The method as recited in embodiment 1, wherein one of the user-selectable investigation directions is a starting point for an investigation to be performed by the expert system, but does not identify a resolution to the problem or the condition.

Embodiment 3. The method as recited in any of embodiments 1-2, wherein the computing system is a data protection system.

Embodiment 4. The method as recited in any of embodiments 1-3, wherein the expert system ranks the set of user-selectable investigation directions by one or more of relevance, context, and diversity, of the user-selectable investigation directions.

Embodiment 5. The method as recited in any of embodiments 1-4, wherein the expert system creates the user-selectable investigation directions based on a similarity analysis and a dissimilarity analysis.

Embodiment 6. The method as recited in any of embodiments 1-5, wherein the sample object is a VM that is not operating as expected by the user.

Embodiment 7. The method as recited in any of embodiments 1-5, wherein the computing system is a data protection system, and the sample object is an object that is protected by the data protection system.

Embodiment 8. The method as recited in any of embodiments 1-7, wherein at an end of an investigation that corresponds to one of the user-selectable investigation directions, the expert system presents, to the user, one or more user-selectable resolutions to a problem identified during the investigation.

Embodiment 9. The method as recited in any of embodiments 1-8, wherein the expert system creates the user-selectable investigation directions based on a similarity analysis that evaluates one or more objects similar to the example object, and based on a dissimilarity analysis.

Embodiment 10. The method as recited in any of embodiments 1-9, further comprising receiving a user selection of one of the investigation directions and, in response to the user selection, the expert system suggests, to the user, options for refining the query to continue an investigation that corresponds to the investigation direction selected by the users.

Embodiment 11. A method for performing any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-11.

G. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 3:
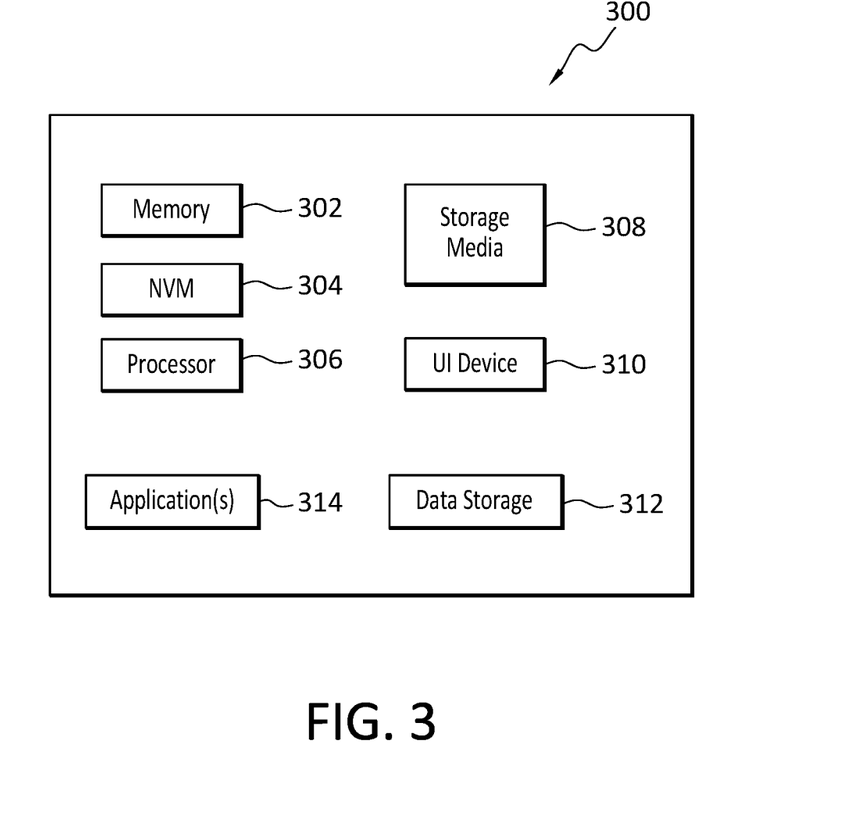
FIG. 3 discloses aspects of an example computing entity operable to perform any of the claimed methods, processes, and operations.

With reference briefly now to FIG. 3, any one or more of the entities disclosed, or implied, by FIGS. 1-2h and/or elsewhere herein, may take the form of, or include, or be implemented on, or hosted by, a physical computing device, one example of which is denoted at 300. As well, where any of the aforementioned elements comprise or consist of a virtual machine (VM), that VM may constitute a virtualization of any combination of the physical components disclosed in FIG. 3.

In the example of FIG. 3, the physical computing device 300 includes a memory 302 which may include one, some, or all, of random access memory (RAM), non-volatile memory (NVM) 304 such as NVRAM for example, read-only memory (ROM), and persistent memory, one or more hardware processors 306, non-transitory storage media 308, UI device 310, and data storage 312. One or more of the memory components 302 of the physical computing device 300 may take the form of solid state device (SSD) storage. As well, one or more applications 314 may be provided that comprise instructions executable by one or more hardware processors 306 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
    scanning a storage device to obtain data and metadata concerning operation of a computing system;
    analyzing the data and, based on the analyzing, deriving data groups that include some of the data, and deriving data relationships among some of the data;
    receiving, by an expert system, a query from a user, wherein the query provides a sample object for the expert system to investigate to gain information about the sample object, but the query does not indicate purpose of the user in submitting the query;
    analyzing the query;
    based on the data groups and data relationships, and based on the analyzing of the query, generating, by the expert system, query results that comprise a set of user-selectable investigation directions that relate to the sample object, wherein the set of user-selectable investigation directions comprise queries including refinement or modification to the query from the user; and
    presenting, by the expert system, the set of user-selectable investigation directions to the user,
    wherein one of the user-selectable investigation directions is a starting point for an investigation to be performed by the expert system, but does not identify a resolution to a problem or a condition,
    wherein the expert system ranks the set of user-selectable investigation directions by one or more of relevance, context, and diversity, of the user-selectable investigation directions, and
    wherein the sample object is a virtual machine (VM) that is not operating as expected by the user.

2. The method as recited in claim 1, wherein the computing system is a data protection system.

3. The method as recited in claim 1, wherein the expert system creates the user-selectable investigation directions based on a similarity analysis and a dissimilarity analysis.

4. The method as recited in claim 1, wherein the computing system is a data protection system, and the sample object is an object that is protected by the data protection system.

5. The method as recited in claim 1, wherein at an end of an investigation that corresponds to one of the user-selectable investigation directions, the expert system presents, to the user, one or more user-selectable resolutions to a problem identified during the investigation.

6. The method as recited in claim 1, wherein the expert system creates the user-selectable investigation directions based on a similarity analysis that evaluates one or more objects similar to an example object, and based on a dissimilarity analysis.

7. The method as recited in claim 1, further comprising receiving a user selection of one of the investigation directions and, in response to the user selection, the expert system suggests, to the user, options for refining the query to continue an investigation that corresponds to the investigation direction selected by the users.

8. A computer readable storage medium having stored therein instructions that are executable by one or more hardware processors to perform operations comprising:
    scanning a storage device to obtain data and metadata concerning operation of a computing system;
    analyzing the data and, based on the analyzing, deriving data groups that include some of the data, and deriving data relationships among some of the data;
    receiving, by an expert system, a query from a user, wherein the query provides a sample object for the expert system to investigate to obtain information about the sample object, but the query does not indicate purpose of the user in submitting the query;
    analyzing the query;
    based on the data groups and data relationships, and based on the analyzing of the query, generating, by the expert system, query results that comprise a set of user-selectable investigation directions that relate to the sample object, wherein the set of user-selectable investigation directions comprise queries including refinement or modification to the query from the user; and
    presenting, by the expert system, the set of user-selectable investigation directions to the user,
    wherein one of the user-selectable investigation directions is a starting point for an investigation to be performed by the expert system, but does not identify a resolution to a problem or a condition,
    wherein the expert system ranks the set of user-selectable investigation directions by one or more of relevance, context, and diversity, of the user-selectable investigation directions, and
    wherein the sample object is a virtual machine (VM) that is not operating as expected by the user.

9. The computer readable storage medium as recited in claim 8, wherein the computing system is a data protection system.

10. The computer readable storage medium as recited in claim 8, wherein the expert system creates the user-selectable investigation directions based on a similarity analysis and a dissimilarity analysis.

11. The computer readable storage medium as recited in claim 8, wherein the computing system is a data protection system, and the sample object is an object that is protected by the data protection system.

12. The computer readable storage medium as recited in claim 8, wherein at an end of an investigation that corresponds to one of the user-selectable investigation directions, the expert system presents, to the user, one or more user-selectable resolutions to a problem identified during the investigation.

13. The computer readable storage medium as recited in claim 8, wherein the expert system creates the user-selectable investigation directions based on a similarity analysis that evaluates one or more objects similar to an example object, and based on a dissimilarity analysis.

14. The computer readable storage medium as recited in claim 8, further comprising receiving a user selection of one of the investigation directions and, in response to the user selection, the expert system suggests, to the user, options for refining the query to continue an investigation that corresponds to the investigation direction selected by the users.

* * * * *